(12) United States Patent
Chueh et al.

(10) Patent No.: US 8,346,466 B2
(45) Date of Patent: Jan. 1, 2013

(54) SYSTEMS AND METHODS FOR DETERMINING HEADING

(75) Inventors: Kainan Chueh, Thousand Oaks, CA (US); T Jeffrey Dickman, Thousand Oaks, CA (US); Reza Ahmadi, Westlake Village, CA (US)

(73) Assignee: Northrop Grumman Guidance & Electronics, Woodland Hills, CA (US)

( * ) Notice: Subject to any disclaimer, the term of this patent is extended or adjusted under 35 U.S.C. 154(b) by 493 days.

(21) Appl. No.: 12/616,487

(22) Filed: Nov. 11, 2009

(65) Prior Publication Data

US 2011/0112767 A1 May 12, 2011

(51) Int. Cl.
*G01C 21/00* (2006.01)
(52) U.S. Cl. ...................................................... 701/216
(58) Field of Classification Search .................. None
See application file for complete search history.

(56) References Cited

U.S. PATENT DOCUMENTS

| | | | |
|---|---|---|---|
| 6,411,898 B2 | 6/2002 | Ishida et al. | |
| 2005/0004748 A1* | 1/2005 | Pinto et al. | 701/200 |
| 2005/0134440 A1* | 6/2005 | Breed | 340/435 |
| 2007/0070069 A1 | 3/2007 | Samarasekera et al. | |
| 2008/0144925 A1* | 6/2008 | Zhu et al. | 382/154 |
| 2008/0167814 A1 | 7/2008 | Samarasekera et al. | |
| 2010/0166256 A1* | 7/2010 | Kmiecik et al. | 382/103 |

FOREIGN PATENT DOCUMENTS

| | | |
|---|---|---|
| EP | 1 972 893 A1 | 9/2008 |
| WO | WO 00/34803 | 6/2000 |

* cited by examiner

*Primary Examiner* — Thomas Tarcza
*Assistant Examiner* — Adam Alharbi
(74) *Attorney, Agent, or Firm* — Tarolli, Sundheim, Covell & Tummino LLP

(57) ABSTRACT

Systems and methods for determining heading of a traveling vehicle are provided. The systems and methods employ an image system to capture and match multiple distinctive features of an image area at a first and second point in time and to determine unit-vectors associated with the multiple distinctive features. A global positioning system (GPS) provides a translation vector for the first and second point and time and a coupled processor employs the unit-vectors and the translation vector to provide a corrected heading.

20 Claims, 4 Drawing Sheets

SYSTEMS AND METHODS FOR DETERMINING HEADING

TECHNICAL FIELD

The present invention relates generally to navigations systems, and more particularly to systems and methods for determining heading.

BACKGROUND

Even with the utilization of a global positioning system (GPS), a low grade inertial measurement unit (IMU) cannot determine its heading angle accurately unless the vehicle experiences significant velocity changes from time to time. For example, without velocity change, the heading accuracy of an IMU equipped with 1 deg/hr gyros aided by GPS is about 0.1 radians. A traditional way to align low grade IMU equipment with GPS or some other external position/velocity reference is to employ S-turns during travel to provide observability of heading errors. Traditional in-flight alignment procedures require the vehicle to execute lengthy horizontal-plane S-turns maneuvers lasting several minutes. Although capable of attaining milliradian alignment accuracy, lengthy traditional alignment procedures generally distract from the goals of a given mission.

SUMMARY

In one embodiment of the invention, a system is provided for determining heading that is mountable on a traveling vehicle. The system comprises an image system that captures multiple distinctive features in an area of interest at a first point in time and at a second point of time during traveling of the traveling vehicle, matches the multiple distinctive features captured at the first point of time and the second point of time, and determines a first unit-vector associated with a given matched distinctive feature based on the first point in time and a second unit-vector associated with the given matched distinctive feature associated with the second point in time for each of the multiple matched distinctive features. The system further comprises a global positioning system (GPS) that determines a translation vector based on carrier phase information captured from the first point in time to the second point in time and a coupled processor that minimizes the error in an epipolar equation for each of the multiple matched distinctive features based on the respective first and second unit-vectors and the translation vector to determine a corrected heading.

In another embodiment of the invention, a system is provided for determining heading that is mountable on a traveling vehicle. The system comprises an image system that captures multiple distinctive features in an area of interest at a first point in time and at a second point of time during traveling of the traveling vehicle, matches the multiple distinctive features captured at the first point of time and the second point of time, and determines a first unit-vector associated with a given matched distinctive feature based on the first point in time and a second unit-vector associated with the given matched distinctive feature associated with the second point in time for each of the multiple matched distinctive features. The system further comprises a global positioning system (GPS) that determines a translation vector based on carrier phase information captured from the first point in time to the second point in time and a coupled processor that minimizes the error in an epipolar equation for each of the multiple matched distinctive features based on the first and second unit-vectors and the translation vector to determine a corrected heading. The system also comprises an inertial measurement system that provides an initial heading to the coupled processor, such that the coupled processor employs the initial heading at a starting point for minimizing the epipolar equation.

In yet a further embodiment of the invention, a method is provided for determining heading of a traveling vehicle employing an image system, an inertial system and a global positioning system (GPS). The method comprises capturing imagery in an area of interest and extracting multiple distinctive feature coordinates at a first point in time, capturing imagery in the area of interest and extracting multiple distinctive feature coordinates at a second point in time and matching the multiple distinctive feature coordinates captured at the first point of time and the second point of time to determine multiple matched distinctive features. The method further comprises providing a first unit-vector associated with a given matched distinctive feature based on the first point in time and a second unit-vector associated with the given matched distinctive feature associated with the second point in time for each of the multiple matched distinctive features, computing a translation vector based on carrier phase information captured from the first point in time to the second point in time and minimizing an epipolar equation for each of the multiple matched distinctive features based on the first and second unit-vectors and the translation vector to determine a corrected heading.

DETAILED DESCRIPTION

Systems and methods are provided for determining heading using visual cues. The use of visual cues eliminates the need for S-turn maneuvers while providing similar performance and offers the potential to improve the heading accuracy when high quality instrumentation is used. In one embodiment of the invention, a system is provided for determining heading that is mountable on a traveling vehicle. The system comprises an image system that identifies and tracks multiple distinctive features in an area of interest at successive points in time during motion of the traveling vehicle. The vision processing procedure involves matching multiple features and then determining a unit-vector associated with each of these matched distinctive features. The system further comprises a global positioning system (GPS) that determines a translation vector based on carrier phase information captured from the first point in time to the second point in time and a coupled processor that minimizes the error in an epipolar equation (EQ. 1) for each of the multiple matched distinctive features based on the respective first and second unit-vectors and the translation vector. A Kalman filter (or some other optimal estimator) can be employed to continuously combine the measurements for a refined heading solution.

It is to be appreciated that platform alignment requires two steps: the determination of the relationship between an arbitrary earth-fixed frame and the body frame and then the determination of this earth-fixed frame with respect to known earth-fixed frame (e.g., North, East, Down). With enough matched features, the vision observations can be combined into platform pose referenced in an earth-fixed coordinate frame (relation to North, East, and Down is not yet known). Then a coupled processor can combine the vision observation with the GPS measurement to determine the final alignment between the body frame and the known earth-fixed frame.

In another embodiment of the invention, the coupled processor employs the GPS translation and the vision observation with the epipolar equation (EQ. 3) to directly solve for the initial heading at the starting point. Alternatively, an inertial measurement system can provide an initial heading at the starting point to the coupled processor.

Hereafter the description of feature matching will be described as a match between two sequential points in time for illustration simplicity, but this operation could involve more than two points in time.

Figure 1:
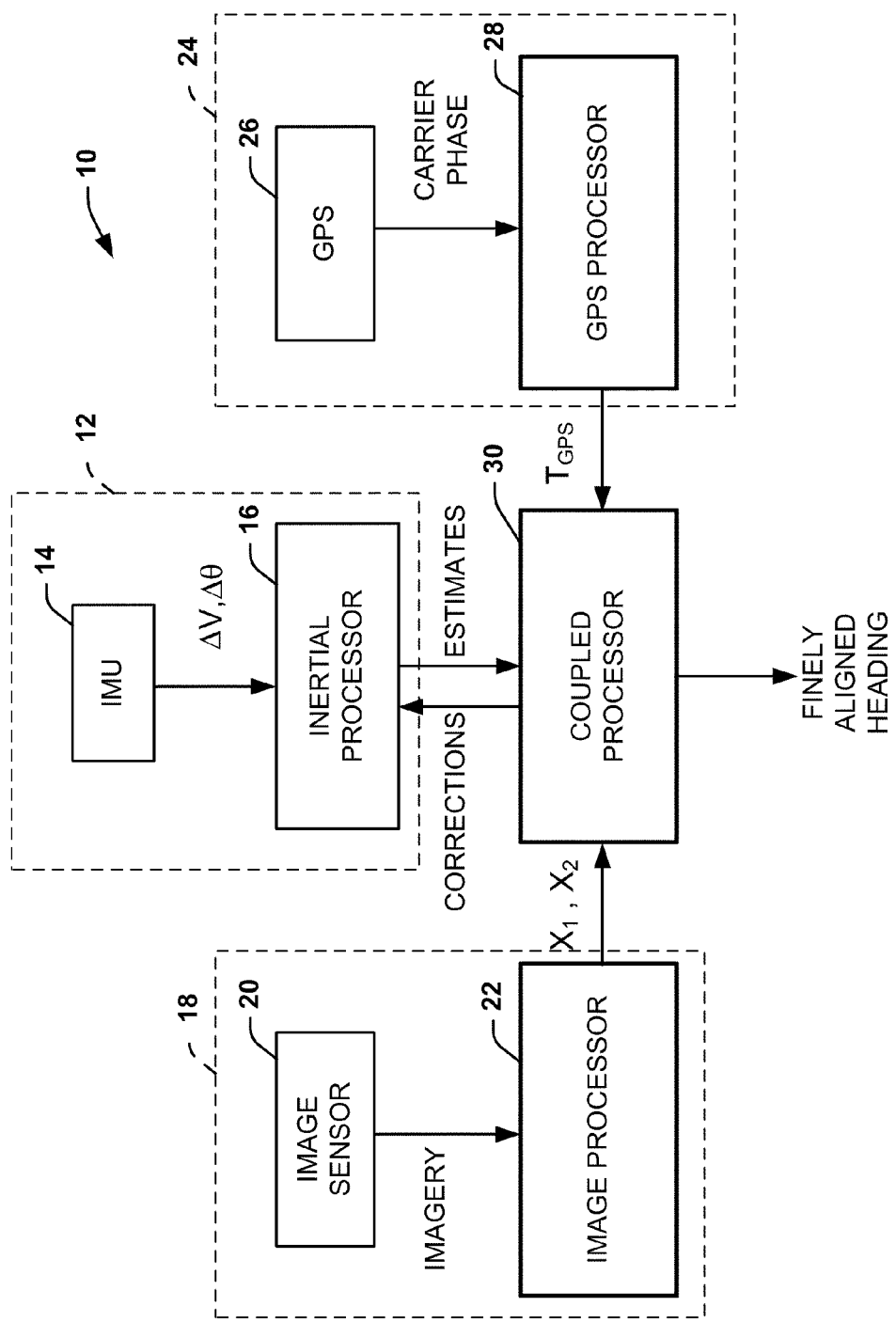
FIG. 1 illustrates a block diagram of a system for determining heading in accordance with an aspect of the invention.

FIG. 1 illustrates a system 10 for determining heading in accordance with an aspect of the present invention. The system 10 includes an inertial measurement system 12, an image system 18 and a global position system (GPS) 24 mounted on a traveling vehicle (not shown). The inertial measurement system 12 includes a relatively inexpensive inertial measurement unit (IMU) 14 and an inertial processor 16. The image system 18 includes an image sensor 20 (e.g., a camera) and an image processor 22. The GPS 24 includes a GPS receiver 26 and a GPS processor 28. Multiple distinctive features of an image area are captured by the image sensor 20 at a first point in time ($t_1$) and a second point in time ($t_2$) during motion of the traveling vehicle. After matching of the multiple distinctive features, a first unit-vector ($x_1$) can be determined at the first point time ($t_1$) and a second unit-vector ($x_2$) can be determined at the second point in time ($t_2$) for each of the multiple matched features by the image processor 22. The image processor 22 provides the first unit-vector ($x_1$) and the second unit-vector ($x_2$) for each of the multiple features to a coupled processor 30. A translation vector $T_{GPS}$ can be determined by the GPS processor 28 based on carrier phase information captured by the GPS receiver 26 from the first point in time ($t_1$) to the second point in time ($t_2$). The GPS processor 28 provides the translation vector $T_{GPS}$ to the coupled processor 30.

During an initial alignment, changes in velocity ($\Delta V$) and attitude ($\Delta \theta$) are provided from the IMU 14 to the inertial processor 16 along with translation information from the GPS processor 28, such that the coupled processor 30 can determine initial position, attitude and heading. The IMU 14 continues providing changes in velocity and attitude and the inertial processor 16 propagates the position, attitude and heading between the first point in time ($t_1$) and the second point in time ($t_2$). These values are provided to the coupled processor 30, which also feeds back correction information to the inertial processor 16.

The translation vector $T_{GPS}$ is determined by the GPS processor 28 in the navigation frame N (north-east-down) and the first unit-vector $x_1$ and the second unit-vector $x_2$ are determined by the image processor 22 that is rigidly related to the body frame B of the IMU 14. The coupled processor 30 is configured to solve and minimize the errors in the epipolar equation:

$$(x_1 \times x_2) \cdot T = 0 \qquad \text{EQ. 1}$$

where $x_1$ and $x_2$ are first and second unit-vectors pointing to the same feature from points $o_1$ and $o_2$, respectively. For convenience (and ignoring the boresight error), it is assumed that the image frame and system body frame are the same. Also assuming that the roll and pitch angles of the IMU 14 are known (they are readily determined by measuring the gravity vector). It means the transformation matrix $C_B^L$ from body frame to some local level frame L is known. Now the problem of solving the heading angle is reduced to solving the transformation matrix $C_N^L$ from a navigation (N) frame to a local (L) frame.

Based on ignoring the above known errors and based on the above known assumptions, the coupled processor 30 determines the heading angle by solving the transformation matrix $C_N^L$ from a navigation (N) frame to a local (L) frame, such that $$C_N^L = \begin{pmatrix} c & s & 0 \\ -s & c & 0 \\ 0 & 0 & 1 \end{pmatrix} \qquad \text{EQ. 2}$$

where $c=\cos(a)$ and $s=\sin(a)$; and a is the heading angle to be solved.

The initial heading angle a can be provided from the inertial processor 16 and substituted into the following epipolar equation:

$$(x_1^L \times x_2^L) \cdot C_N^L T^N = 0 \qquad \text{EQ. 3}$$

and the heading angle corrected iteratively by the coupled processor 30 until a heading angle is provided that provides results of the epipolar equation that are minimized (e.g., approximately 0). This is repeated for each of the multiple distinctive features. The coupled processor 30 averages the heading angles derived from the multiple distinctive features and outputs an initial heading alignment for the system 10.

The system 10 for determining heading has many useful applications. Primarily, this technique allows the use of a low cost stand-alone GPS-IMU-Camera package in an aircraft, a land vehicle, or a helicopter to determine its heading without the need for custom trajectories or maneuvers such as S-turns. It can also be applied to the situation where some kind of vision sensor is already available, for example Electro/Optical sensors or a SAR (Synthetic Aperture Radar).

Figure 2:
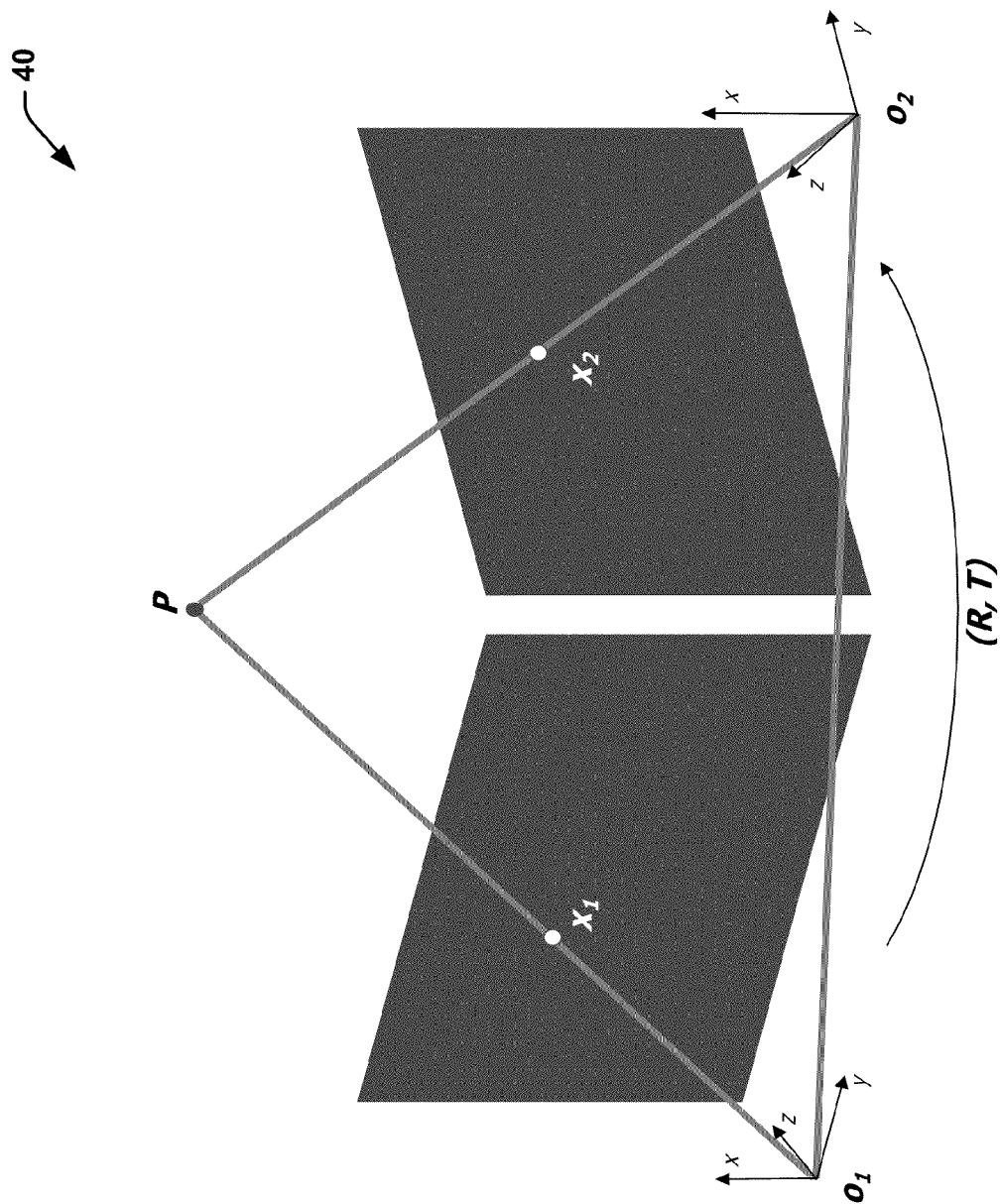
FIG. 2 illustrates an epipolar geometry graph that facilitates the describing of the computations performed by the coupled processor in accordance with an aspect of the present invention.

FIG. 2 illustrates an epipolar geometry graph 40 that facilitates the describing of the computations performed by the coupled processor in accordance with an aspect of the present invention. A feature at location p in 3D space is observed by an image sensor at two times ($t_1$ and $t_2$) located at points $o_1$ and $o_2$ respectively. Let $x_1$ and $x_2$ be the vectors from $o_1$ and $o_2$ to p, respectively in the north-east-down navigation coordinate frame (N). Let T be the translation vector from $o_1$ to $o_2$. The image sensor provides the direction (unit-vector) to the feature. It is measured in the image sensor frame, which is rigidly related to the body frame (B) of the IMU, and then transformed to the navigation frame. For convenience (assuming unity focal length and ignoring the boresight error), it is assumed that the image sensor frame and IMU body frame are the same. For example, $$\text{Let } x_1 = \frac{X_1}{\|X_1\|} \text{ and } x_2 = \frac{X_2}{\|X_2\|} \qquad \text{EQ. 4}$$

The epipolar equation states that:

$$r = x_2 \cdot (T \times x_1) = 0, \qquad \text{EQ. 5}$$

where "·" is dot product and "×" is cross product.
The above equation simply states that the three vectors $x_1$, $x_2$, and T are on the same plane. EQ. 5 can be rewritten as:

$$r = (x_1 \times x_2) \cdot T = 0, \qquad \text{EQ. 6}$$

In one aspect of the invention, the coupled processor 30 is a Kalman filter. The solution above can be refined by using a Kalman filter as described below. Since the image sensor frame is related to the IMU frame, the image measurements share the same attitude error as the IMU frame. The error of EQ. 6 can be expressed as follows:

$$\delta r = -\phi \times (x_1 \times x_2) \cdot T + (x_1 \times x_2) \cdot \delta T + \text{measurement noise} \qquad \text{EQ. 7}$$

$$\delta r = T \times (x_1 \times x_2) \cdot \phi + (x_1 \times x_2) \cdot \delta T + \text{measurement noise} \qquad \text{EQ. 8}$$

where $\phi$ = attitude error (tilt and heading error); a translation error.
Since $\delta T$ can be measured accurately by GPS, EQ. 8 provides enough information for the Kalman filter to resolve the attitude error $\phi$ (tilts and heading error).

Figure 3:
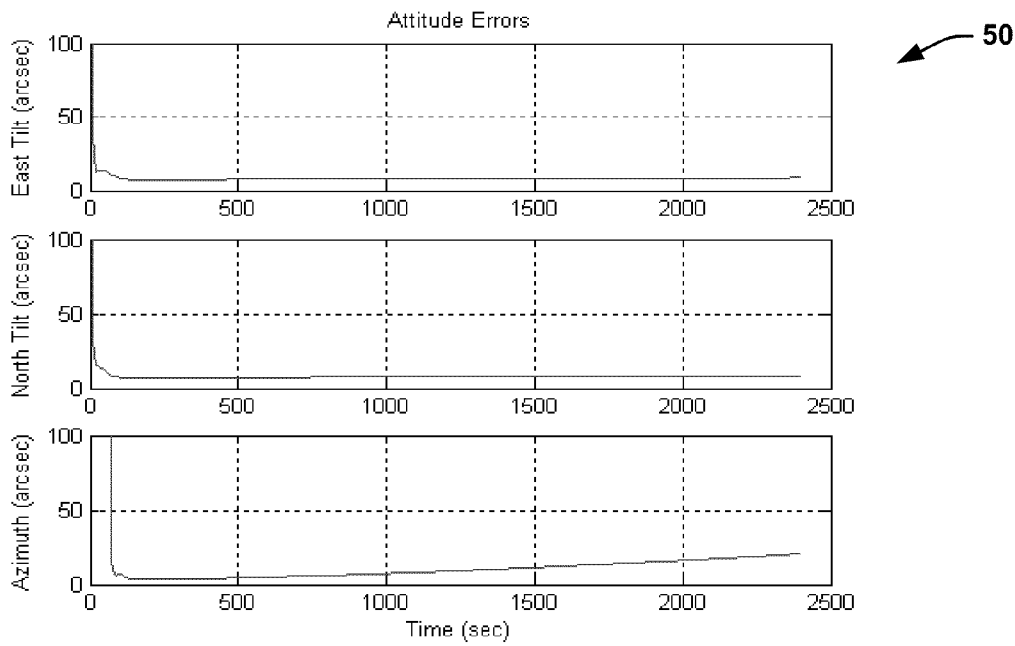
FIG. 3 illustrates a graph of inertial orientation errors versus time on a first simulation performed with free inertial orientation errors of baro-aided navigation-grade Inertial Navigation System (INS) without GPS and with an S-turn alignment maneuver.
Figure 4:
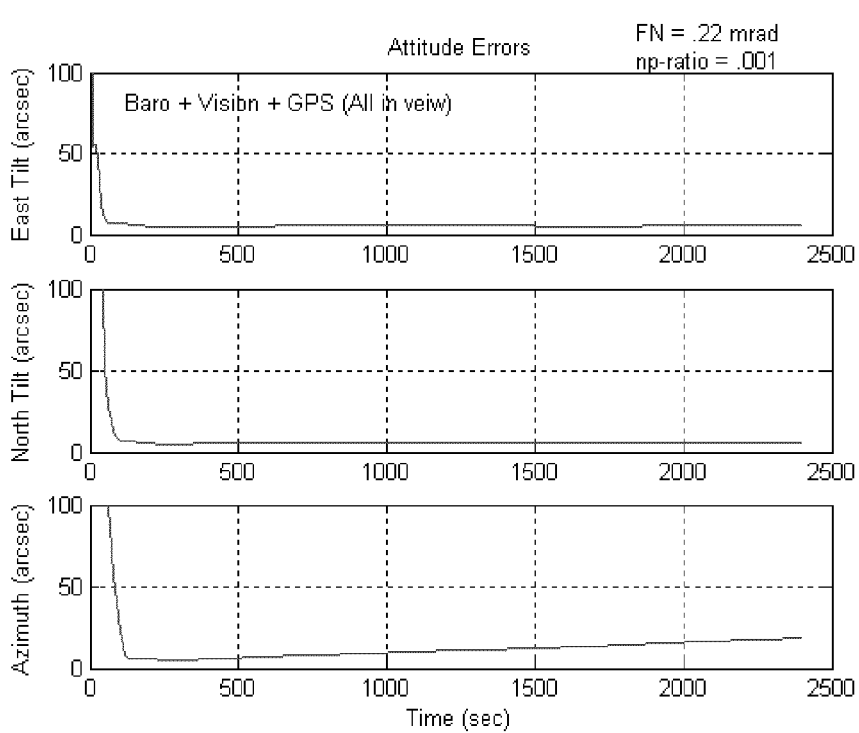
FIG. 4 illustrates a graph of inertial orientation errors versus time on a second simulation performed without S-turn alignment employing baro-aided navigation-grade INS with continuous alignment vision observations in accordance with an aspect of the present invention.

FIG. 3 illustrates a graph 50 of inertial orientation errors versus time on a first simulation performed with free inertial orientation errors of baro-aided navigation-grade INS during GPS denial after S-turn alignment. FIG. 4 illustrates a graph 60 of inertial orientation errors versus time on a second simulation performed without S-turn alignment employing baro-aided INS with continuous alignment using an image sensor in accordance with an aspect of the present invention. To illustrate the results, the baro-aided free inertial orientation accuracy (1α from 30 Monte Carlo runs) with S-turn alignment and without vision is illustrated in FIG. 3. The heading accuracy is the primary beneficiary of alignment procedures since the S-turn maneuver can be removed when vision is included and the performance is nearly the same. For this example, vision aiding was provided by a downward looking EO vision sensor matching five features between sequential frames. The simulated vision accuracy consisted of a feature noise of 0.22 mrad and a feature range accuracy of 0.1% of the total range. These parameters would be representative of a high-performance camera. The corresponding orientation accuracy with vision alignment without S-turns is illustrated in FIG. 4. It should be noted that FIG. 4 illustrates similar heading alignment accuracy using vision as the S-turn case in FIG. 3 without the need to add special maneuvers (such as S-turns) to the mission profile.

Figure 5:
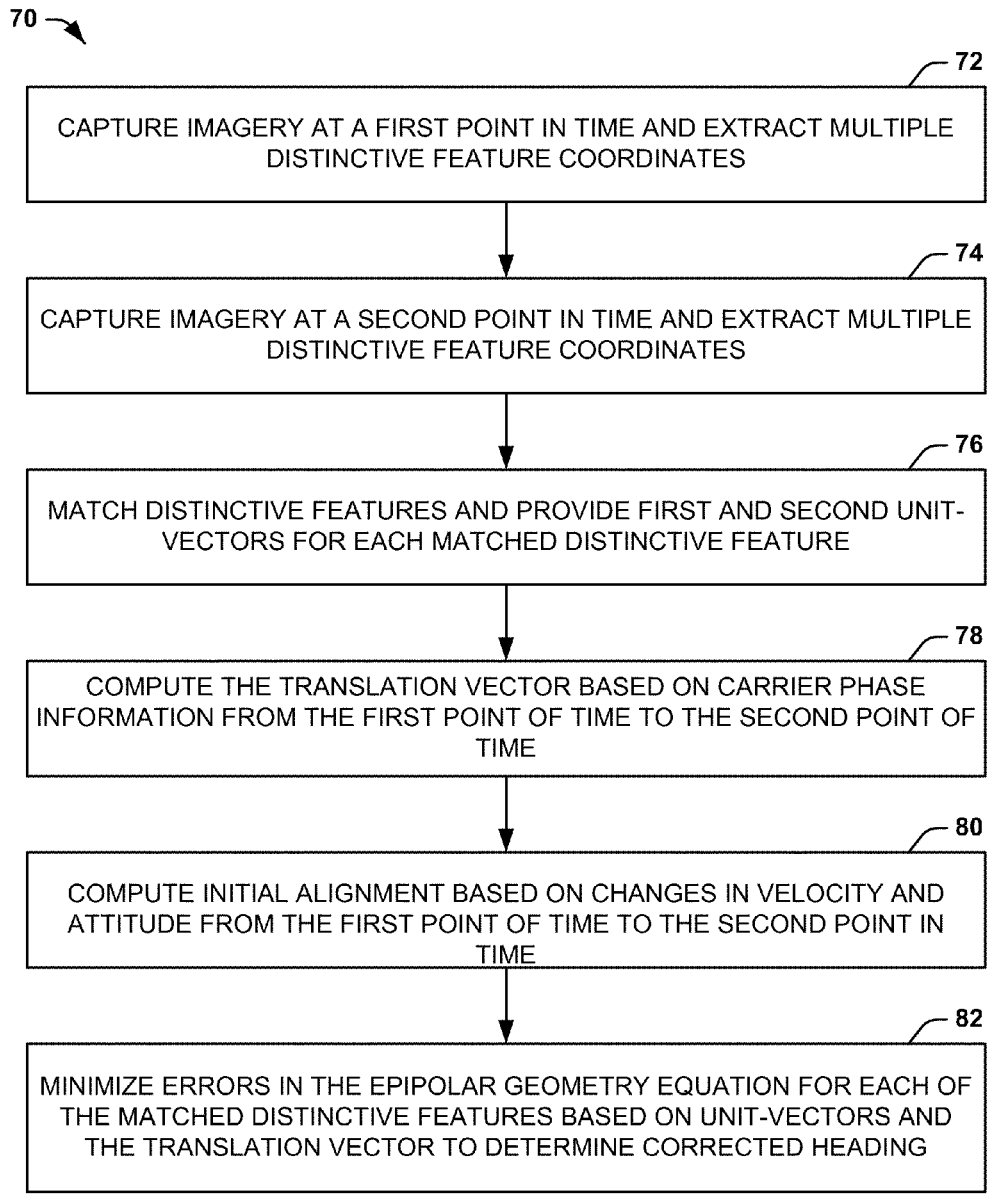
FIG. 5 illustrates a methodology for determining heading in accordance with an aspect of the invention.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 illustrates an example of a methodology 70 for determining heading in accordance with an aspect of the invention. The methodology employs an image system, an inertial measurement system and a GPS mounted on a traveling vehicle. At 72, imagery of an image area is captured by the image sensor at a first point in time ($t_1$) during traveling of the traveling vehicle and multiple distinctive feature coordinates are extracted by image processing. At 74, imagery of the image area is captured by the image sensor at a second point in time ($t_2$) during traveling of the traveling vehicle and multiple distinctive feature coordinates are extracted by image processing. At 76, the distinctive feature coordinates are matched and a first unit-vector ($x_1$) is determined based on the first point time ($t_1$) and a second unit vector ($x_2$) is determined based on the second point in time ($t_2$) for each of the multiple matched distinctive features. The methodology 70 then proceeds to 78.

At 78, a translation vector $T_{GPS}$ is computed based on carrier phase information provided by a GPS device from the first point in time ($t_1$) to the second point in time ($t_2$). At 80, an inertial measurement system that provides an initial leveling to the coupled processor. The coupled processor can employ the initial leveling to directly solve the epipolar equation for heading based on EQ. 3. At 82, the error in the epipolar equation is minimized for each matched distinctive feature based on the first unit-vector ($x_1$) and the second unit vector ($x_2$) for a given matched distinctive feature, the translation vector $T_{GPS}$, and the initial leveling from 80 to determine a corrected heading associated with each of the matched distinctive features. The corrected headings can be averaged to provide a finely aligned corrected heading. The epipolar geometry equation can be based on EQ. 3 when directly computing the initial heading, or based on EQ. 8 if an IMU is available. The coupled processor can use a Kalman filter to continuously refine the heading.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:
1. A system for determining heading that is mountable on a traveling vehicle, the system comprising:
an image system that captures multiple distinctive features in an area of interest at a first point in time and at a second point of time during traveling of the traveling vehicle, matches the multiple distinctive features captured at the first point of time and the second point of time, and determines a first unit-vector associated with a given matched distinctive feature based on the first point in time and a second unit-vector associated with the given matched distinctive feature associated with the second point in time for each of the multiple matched distinctive features;
a global positioning system (GPS) that determines a translation vector based on carrier phase information captured from the first point in time to the second point in time; and
a coupled processor that minimizes the error in an epipolar equation for each of the multiple matched distinctive features based on the respective first and second unit-vectors and the translation vector to determine a corrected heading, wherein the epipolar equation comprises data characterizing a distinctive feature captured at the first point in time and a distinctive feature captured at the second point in time.

2. The system of claim 1, further comprising an inertial measurement system that provides an initial leveling to the coupled processor, the coupled processor employing the initial leveling to directly solve the epipolar equation for heading.

3. The system of claim 2, wherein the inertial measurement system comprises an inertial measurement unit (IMU) and an inertial processor, the IMU provides changes in velocity and attitude to the inertial processor and the inertial processor determines estimates of position, heading and attitude.

4. A system for determining heading that is mountable on a traveling vehicle, the system comprising:
   an image system that captures multiple distinctive features in an area of interest at a first point in time and at a second point of time during traveling of the traveling vehicle, matches the multiple distinctive features captured at the first point of time and the second point of time, and determines a first unit-vector associated with a given matched distinctive feature based on the first point in time and a second unit-vector associated with the given matched distinctive feature associated with the second point in time for each of the multiple matched distinctive features;
   a global positioning system (GPS) that determines a translation vector based on carrier phase information captured from the first point in time to the second point in time; and
   a coupled processor that minimizes the error in an epipolar equation for each of the multiple matched distinctive features based on the respective first and second unit-vectors and the translation vector to determine a corrected heading;
   wherein the epipolar equation is $(x_1^L \times x_2^L) \cdot C_N^L T^N = 0$, where $x_1^L$ is the first unit-vector, $x_2^L$ is the second unit-vector, $T^N$ is the translation vector and $C_N^L$ is the transformation matrix from a navigation frame (N) frame to a local frame (L) frame, such that $$C_N^L = \begin{pmatrix} c & s & 0 \\ -s & c & 0 \\ 0 & 0 & 1 \end{pmatrix}$$

where $c=\cos(a)$ and $s=\sin(a)$ and $a$ is the heading angle to be solved.

5. The system of claim 4, further comprising an inertial measurement system that provides an initial heading to the coupled processor, the coupled processor employing the initial heading at a starting point for iteratively correcting the heading angle until a heading angle is provided that minimizes the error in the epipolar equation.

6. The system of claim 1, wherein the coupled processor averages the determined corrected headings of each of the multiple matched distinctive features to directly compute heading for the system.

7. A system for determining heading that is mountable on a traveling vehicle, the system comprising:
   an image system that captures multiple distinctive features in an area of interest at a first point in time and at a second point of time during traveling of the traveling vehicle, matches the multiple distinctive features captured at the first point of time and the second point of time, and determines a first unit-vector associated with a given matched distinctive feature based on the first point in time and a second unit-vector associated with the given matched distinctive feature associated with the second point in time for each of the multiple matched distinctive features;
   a global positioning system (GPS) that determines a translation vector based on carrier phase information captured from the first point in time to the second point in time; and
   a coupled processor that minimizes the error in an epipolar equation for each of the multiple matched distinctive features based on the respective first and second unit-vectors and the translation vector to determine a corrected heading;
   wherein the coupled processor is a Kalman filter and the epipolar equation is $\delta r = T \times (x_1 \times x_2) \cdot \phi + (x_1 \times x_2) \cdot \delta T$, where $x_1$ is the first unit-vector, $x_2$ is the second unit-vector, $T$ is the translation vector, where $\phi$=attitude error and $\delta T$=translation error, such that the Kalman filter resolves the attitude error $\phi$ and $\delta T$ is measured by the GPS.

8. The system of claim 1, wherein the GPS comprises a GPS device and a GPS processor, the GPS device provides carrier phase information and the GPS processor determines the translation vector.

9. The system of claim 1, wherein the image system comprises an image sensor and an image processor, the image sensor captures the multiple distinctive features in the area of interest at the first point in time and at the second point of time during traveling of the traveling vehicle, and the image processor matches the multiple distinctive features captured at the first point of time and the second point of time, and determines the first unit-vector associated with a given matched distinctive feature based on the first point in time and the second unit-vector associated with the given matched distinctive feature associated with the second point in time for each of the multiple matched distinctive features.

10. A system for determining heading that is mountable on a traveling vehicle, the system comprising:
    an image system that captures multiple distinctive features in an area of interest at a first point in time and at a second point of time during traveling of the traveling vehicle, matches the multiple distinctive features captured at the first point of time and the second point of time, and determines a first unit-vector associated with a given matched distinctive feature based on the first point in time and a second unit-vector associated with the given matched distinctive feature associated with the second point in time for each of the multiple matched distinctive features;
    a global positioning system (GPS) that determines a translation vector based on carrier phase information captured from the first point in time to the second point in time;
    a coupled processor that minimizes the error in an epipolar equation for each of the multiple matched distinctive features based on the first and second unit-vectors and the translation vector to determine a corrected heading; and
    an inertial measurement system that provides an initial heading to the coupled processor, the coupled processor employing the initial heading at a starting point for minimizing the epipolar equation, wherein the epipolar equation comprises data characterizing a distinctive feature captured at the first point in time and a distinctive feature captured at the second point in time.

11. The system of claim 10, wherein the epipolar equation is $(x_1^L \times x_2^L) \cdot C_N^L T^N = 0$, where $x_1^L$ is the first unit-vector, $x_2^L$ is the second unit-vector, $T^N$ is the translation vector and $C_N^L$ is the transformation matrix from a navigation frame (N) frame to a local frame (L) frame, such that $$C_N^L = \begin{pmatrix} c & s & 0 \\ -s & c & 0 \\ 0 & 0 & 1 \end{pmatrix}$$

where c=cos(a) and s=sin(a) and a is the heading angle to be solved.

12. The system of claim 10, wherein the coupled processor averages the determined corrected headings of each of the multiple matched distinctive features to directly compute the heading for the system.

13. The system of claim 10, wherein the coupled processor is a Kalman filter and the epipolar equation is $\delta r = T \times (x_1 \times x_2) \cdot \phi + (x_1 \times x_2) \cdot \delta T$, where $x_1$ is the first unit-vector, $x_2$ is the second unit-vector, T is the translation vector, where $\phi$=attitude error and $\delta T$=translation error, such that the Kalman filter resolves the attitude error $\phi$ and $\delta T$ is measured by GPS.

14. The system of claim 1, wherein the GPS comprises a GPS device and a GPS processor, the GPS device provides carrier phase information and the GPS processor determines the translation vector, the image system comprises an image sensor and an image processor, the image sensor captures the multiple distinctive features in the area of interest at the first point in time and at the second point of time during traveling of the traveling vehicle, and the image processor matches the multiple distinctive features captured at the first point of time and the second point of time, and determines the first unit-vector associated with a given matched distinctive feature based on the first point in time and the second unit-vector associated with the given matched distinctive feature associated with the second point in time for each of the multiple matched distinctive features and the inertial measurement system comprises an inertial measurement unit (IMU) and an inertial processor, the IMU provides changes in velocity and attitude to the inertial processor and the inertial processor determined estimates of position, heading and attitude.

15. A method for determining heading of a traveling vehicle employing an image system, an inertial system and a global positioning system (GPS), the method comprising:
capturing imagery, by the image system, in an area of interest and extracting multiple distinctive feature coordinates at a first point in time;
capturing imagery, by the image system, in the area of interest and extracting multiple distinctive feature coordinates at a second point in time;
matching, by the image system, the multiple distinctive feature coordinates captured at the first point of time and the second point of time to determine multiple matched distinctive features;
providing, from the image system, a first unit-vector associated with a given matched distinctive feature based on the first point in time and a second unit-vector associated with the given matched distinctive feature associated with the second point in time for each of the multiple matched distinctive features;
computing, by the GPS, a translation vector based on carrier phase information captured from the first point in time to the second point in time; and
minimizing, by a coupled processor, an epipolar equation for each of the multiple matched distinctive features based on the first and second unit-vectors and the translation vector to determine a corrected heading, wherein the epipolar equation comprises data characterizing a distinctive feature captured at the first point in time and a distinctive feature captured at the second point in time.

16. The method of claim 15, further comprising employing, by the coupled processor, an initial heading provided by the IMU at a starting point for minimizing the epipolar equation.

17. The method of claim 15, wherein the epipolar equation is $(x_1^L \times x_2^L) \cdot C_N^L T^N = 0$, where $x_1^L$ is the first unit-vector, $x_2^L$ is the second unit-vector, $T^N$ is the translation vector and $C_N^L$ is the transformation matrix from a navigation frame (N) frame to a local frame (L) frame, such that $$C_N^L = \begin{pmatrix} c & s & 0 \\ -s & c & 0 \\ 0 & 0 & 1 \end{pmatrix}$$

where c=cos(a) and s=sin(a) and a is the heading angle to be solved.

18. The method of claim 15, further comprising averaging, by the coupled processor, the determined corrected headings of each of the multiple matched distinctive features to directly compute the aligned heading.

19. The method of claim 15, wherein the epipolar equation is $\delta r = T \times (x_1 \times x_2) \cdot \phi + (x_1 \times x_2) \cdot \delta T$, where $x_1$ is the first unit-vector, $x_2$ is the second unit-vector, T is the translation vector, where $\phi$=attitude error and $\delta T$=translation error.

20. The method of claim 19, wherein a Kalman filter resolves the attitude error $\phi$ and $\delta T$ is measured by the GPS.

* * * * *